(12) United States Patent
Ford et al.

(10) Patent No.: US 9,644,054 B2
(45) Date of Patent: May 9, 2017

(54) DENSE ARTICLES FORMED FROM TETRAFLUOROETHYLENE CORE SHELL COPOLYMERS AND METHODS OF MAKING THE SAME

(71) Applicants: W. L. Gore & Associates, Inc., Newark, DE (US); W. L. Gore & Associates GmbH, Putzbrunn (DE)

(72) Inventors: Lawrence A. Ford, München (DE); Michael E. Kennedy, Oxford, PA (US); Shaofeng Ran, Kennett Square, PA (US); Todd S. Sayler, Bear, DE (US); Gregory J. Shafer, Oxford, PA (US)

(73) Assignees: W. L. Gore & Associates, Inc., Newark, DE (US); W. L. Gore & Associates GmbH, Putzbrunn (DE)

( * ) Notice: Subject to any disclaimer, the term of this patent is extended or adjusted under 35 U.S.C. 154(b) by 0 days.

(21) Appl. No.: 14/577,597

(22) Filed: Dec. 19, 2014

(65) Prior Publication Data
US 2016/0177001 A1 Jun. 23, 2016

(51) Int. Cl.
| | | |
|---|---|---|
| C08F 214/26 | (2006.01) |
| C08F 259/08 | (2006.01) |
| B29C 55/00 | (2006.01) |
| B32B 15/085 | (2006.01) |
| B32B 27/08 | (2006.01) |
| B32B 27/32 | (2006.01) |
| C08J 9/00 | (2006.01) |
| C09D 127/18 | (2006.01) |
| C08J 5/18 | (2006.01) |
| B29C 55/02 | (2006.01) |
| B29K 27/18 | (2006.01) |
| B29L 9/00 | (2006.01) |

(52) U.S. Cl.
CPC .......... *C08F 214/26* (2013.01); *B29C 55/005* (2013.01); *B32B 15/085* (2013.01); *B32B 27/08* (2013.01); *B32B 27/322* (2013.01); *C08F 214/262* (2013.01); *C08F 259/08* (2013.01); *C08J 5/18* (2013.01); *C08J 9/00* (2013.01); *C09D 127/18* (2013.01); *B29C 55/023* (2013.01); *B29K 2027/18* (2013.01); *B29K 2995/0063* (2013.01); *B29L 2009/00* (2013.01); *B32B 2307/30* (2013.01); *C08J 2327/18* (2013.01)

(58) Field of Classification Search
CPC .................................................. C08F 259/08
See application file for complete search history.

(56) References Cited

U.S. PATENT DOCUMENTS

| 3,196,194 A | 7/1965 | Ely, Jr. et al. |
| 3,654,210 A | 4/1972 | Kuhls et al. |
| 3,655,611 A | 4/1972 | Mueller |
| 3,929,950 A | 12/1975 | Nakamura et al. |
| 3,953,566 A | 4/1976 | Gore |
| 4,016,345 A | 4/1977 | Holmes |
| 4,036,802 A | 7/1977 | Poirier |
| 4,038,231 A | 7/1977 | Downer |
| 4,129,618 A | 12/1978 | Downer |
| 4,187,390 A | 2/1980 | Gore |
| 4,194,041 A | 3/1980 | Gore |
| 4,381,384 A | 4/1983 | Khan |
| 4,391,940 A | 7/1983 | Kuhls |
| 4,469,744 A | 9/1984 | Grot |
| 4,518,650 A | 5/1985 | Grot |
| RE31,907 E | 6/1985 | Poirier |
| 4,576,869 A | 3/1986 | Malhotra |
| 4,623,670 A | 11/1986 | Mutoh et al. |
| 4,675,380 A | 6/1987 | Buckmaster |
| 4,742,122 A | 5/1988 | Buckmaster |

(Continued)

FOREIGN PATENT DOCUMENTS

| EP | 0352749 | 1/1990 |
| EP | 1192957 A2 | 4/2002 |

(Continued)

OTHER PUBLICATIONS

International Standard ISO 12086-1: 2006, Fluoropolymer dispersions and mounding and extrusion materials: Part 1: Designation system and basis for specifications, Geneva, Switzerland (2006).
Drobny, Technology of Fluoropolymers Second Edition; General Chemistry (7 pages).
Ebnesajjad, Sina; Fluoroplastics, PCL Handbook Series, vol. 1, Non-Melt Processible Fluoroplastics, The Definitive User's Guide and Databank; pp. 51-52.

(Continued)

*Primary Examiner* — Nicole M Buie-Hatcher
(74) *Attorney, Agent, or Firm* — Amy L. Miller (57) ABSTRACT

A dense article that includes a dense TFE copolymer film is provided. The dense TFE copolymer film includes a first endotherm between about 50° C. and about 300° C., a second endotherm between about 320° C. and about 350° C., and a third endotherm between about 350° C. and about 400° C. To form the dense article, a core shell TFE copolymer is formed into a pellet, ram extruded into a tape, dried into a dried preform, and then stretched into a dense TFE copolymer film that exhibits improved physical and mechanical properties. The dense TFE copolymer film is produced directly from the dried preform at a deformation temperature less than about 335° C. and without increasing the porosity of the dried preform, as would conventionally be done in expansion processes. The dense TFE copolymer films have a methane permeability less than about 20 μg*micron/cm²/min. The dense articles have a void volume less than about 20%.

78 Claims, 4 Drawing Sheets

(56) References Cited

U.S. PATENT DOCUMENTS

| | | |
|---|---|---|
| 4,770,927 A | 9/1988 | Effenberger |
| 4,780,490 A | 10/1988 | Mizuno et al. |
| 4,792,594 A | 12/1988 | Gangal |
| 4,824,511 A | 4/1989 | Hattmati |
| 4,830,062 A | 5/1989 | Yamamoto et al. |
| 4,837,267 A | 6/1989 | Malhotra |
| 4,840,998 A | 6/1989 | Shimizu |
| 4,879,362 A | 11/1989 | Morgan |
| 4,904,726 A | 2/1990 | Morgan |
| 4,952,630 A | 8/1990 | Morgan |
| 4,952,636 A | 8/1990 | Morgan |
| 5,064,593 A | 11/1991 | Tamaru et al. |
| 5,188,764 A | 2/1993 | Shimizu et al. |
| 5,230,937 A | 7/1993 | Effenbercier |
| 5,266,639 A | 11/1993 | Chapman |
| 5,374,473 A | 12/1994 | Knox et al. |
| 5,374,683 A | 12/1994 | Morgan |
| 5,397,829 A | 3/1995 | Morgan |
| 5,464,904 A | 11/1995 | Chapman |
| 5,494,752 A | 2/1996 | Shimizu |
| 5,506,281 A | 4/1996 | Muhlbauer |
| 5,523,346 A * | 6/1996 | Wu ........................ C08F 214/18 524/805 |
| 5,547,551 A | 8/1996 | Bahar |
| 5,547,761 A | 8/1996 | Chapman |
| 5,599,614 A | 2/1997 | Bahar |
| 5,635,041 A | 6/1997 | Bahar |
| 5,637,663 A | 6/1997 | Anolick |
| 5,681,402 A | 10/1997 | Ichinose |
| 5,731,394 A | 3/1998 | Treat |
| 5,756,620 A | 5/1998 | Aten |
| 5,861,324 A | 1/1999 | Ichinose |
| 5,898,042 A | 4/1999 | Sawada et al. |
| 5,922,425 A | 7/1999 | Greuel |
| 5,922,468 A | 7/1999 | Huesmann |
| 5,925,705 A | 7/1999 | Araki |
| 5,972,449 A | 10/1999 | Chung |
| 6,025,092 A | 2/2000 | Doyle |
| 6,060,167 A | 5/2000 | Morgan |
| 6,071,600 A | 6/2000 | Rosenmayer |
| 6,103,361 A | 8/2000 | Batzar |
| 6,107,423 A | 8/2000 | Wheland |
| 6,114,028 A | 9/2000 | Muchin |
| 6,114,452 A | 9/2000 | Schmiegel |
| 6,127,486 A | 10/2000 | Burger |
| 6,133,389 A | 10/2000 | Anolick |
| 6,136,933 A | 10/2000 | Jones |
| 6,140,410 A | 10/2000 | Kolouch |
| 6,140,436 A | 10/2000 | Doyle |
| 6,143,675 A | 11/2000 | McCollam et al. |
| 6,156,453 A | 12/2000 | Shimizu et al. |
| 6,166,138 A | 12/2000 | Kolouch |
| 6,177,196 B1 | 1/2001 | Brothers |
| 6,177,533 B1 | 1/2001 | Woodward |
| 6,191,208 B1 | 2/2001 | Takahashi |
| 6,197,904 B1 | 3/2001 | Gangal |
| 6,211,319 B1 | 4/2001 | Schmiegel |
| 6,221,970 B1 | 4/2001 | Morken |
| 6,228,963 B1 | 5/2001 | Wheland |
| 6,232,372 B1 | 5/2001 | Brothers |
| 6,248,435 B1 | 6/2001 | Leck |
| RE37,307 E | 8/2001 | Bahar |
| 6,281,296 B1 | 8/2001 | MacLachlan |
| 6,287,702 B1 | 9/2001 | Kolouch |
| 6,291,054 B1 | 9/2001 | Thomas |
| 6,300,445 B1 | 10/2001 | Hung |
| 6,312,814 B1 | 11/2001 | Kolouch |
| 6,359,030 B1 | 3/2002 | Tsuda |
| RE37,656 E | 4/2002 | Bahar |
| RE37,701 E | 5/2002 | Bahar |
| 6,395,848 B1 | 5/2002 | Morgan |
| 6,403,213 B1 | 6/2002 | Huesmann |
| 6,403,758 B1 | 6/2002 | Loomis |
| 6,416,698 B1 | 7/2002 | Mertdogan |
| 6,423,798 B2 | 7/2002 | Wheland |
| 6,429,258 B1 | 8/2002 | Morgan |
| 6,472,594 B1 | 10/2002 | Ichinose |
| 6,486,280 B1 | 11/2002 | Anolick |
| 6,509,429 B1 | 1/2003 | Kitaichi |
| 6,518,349 B1 | 2/2003 | Felix |
| 6,518,381 B2 | 2/2003 | Kobayashi |
| 6,538,058 B2 | 3/2003 | Kobayashi |
| 6,541,589 B1 | 4/2003 | Baillie |
| 6,551,708 B2 | 4/2003 | Tsuda |
| 6,582,628 B2 | 6/2003 | Kondo |
| 6,592,977 B2 | 7/2003 | Thomas |
| 6,638,999 B2 | 10/2003 | Bish |
| 6,689,833 B1 | 2/2004 | Bidstrup |
| 6,730,762 B2 | 5/2004 | Lousenberg |
| 6,750,294 B2 | 6/2004 | Sugiyama |
| 6,761,964 B2 | 7/2004 | Tannenbaum |
| 6,770,404 B1 | 8/2004 | Wheland |
| 6,803,419 B2 | 10/2004 | Tsuda |
| 6,803,437 B2 | 10/2004 | Kobayashi |
| 6,806,332 B2 | 10/2004 | Royer |
| 6,822,059 B2 | 11/2004 | Buckanin |
| 6,822,060 B2 | 11/2004 | Kobayashi |
| 6,824,930 B1 | 11/2004 | Wheland |
| 6,833,418 B2 | 12/2004 | Tan |
| 6,841,594 B2 | 1/2005 | Jones |
| 6,870,020 B2 | 3/2005 | Aten |
| 6,914,105 B1 | 7/2005 | Charpentier |
| 6,921,606 B2 | 7/2005 | Sassa et al. |
| 6,956,078 B2 | 10/2005 | Cavanaugh |
| 7,049,365 B2 | 5/2006 | Uschold |
| 7,063,839 B2 | 6/2006 | Royer |
| 7,064,170 B2 | 6/2006 | Kaspar |
| 7,084,225 B2 | 8/2006 | Baillie |
| 7,521,010 B2 | 4/2009 | Kennedy et al. |
| 7,531,611 B2 | 5/2009 | Sabol et al. |
| 7,829,170 B1 | 11/2010 | Bowen et al. |
| 8,012,555 B2 | 9/2011 | Zumbrum |
| 8,637,144 B2 | 1/2014 | Ford |
| 8,911,844 B2 | 12/2014 | Ford |
| 9,040,646 B2 | 5/2015 | Ford |
| 2005/0064195 A1 | 3/2005 | Kobayashi |
| 2005/0220848 A1 | 10/2005 | Bates |
| 2006/0041091 A1 | 2/2006 | Chang |
| 2006/0148912 A1 | 7/2006 | Katsurao et al. |
| 2006/0233990 A1 | 10/2006 | Humphrey |
| 2009/0093602 A1* | 4/2009 | Ford ................... B29C 55/005 526/206 |
| 2013/0231733 A1* | 9/2013 | Knisley ................ A61L 31/146 623/1.15 |
| 2015/0111031 A1 | 4/2015 | Ford |

FOREIGN PATENT DOCUMENTS

| | | |
|---|---|---|
| EP | 1 201 689 | 5/2002 |
| EP | 1 746 130 | 1/2007 |
| GB | 2 337 991 | 12/1999 |
| JP | 56 92943 | 7/1981 |
| JP | 05279506 A * | 10/1993 |
| JP | 10-243976 | 12/1997 |
| JP | 11-240917 | 9/1999 |
| JP | 11-240918 | 9/1999 |
| JP | 2003-192815 | 7/2003 |
| JP | 2005-306033 | 11/2005 |
| JP | 2007-514481 | 6/2007 |
| JP | 2010-540749 | 12/2010 |
| JP | 2012036266 A * | 2/2012 |
| WO | WO97/36952 | 10/1997 |
| WO | WO98/07450 | 2/1998 |
| WO | WO99/07307 | 2/1999 |
| WO | WO2007/005361 | 1/2007 |
| WO | WO 2007/015961 | 2/2007 |
| WO | WO2009/045423 | 4/2009 |
| WO | WO2009045423 | 4/2009 |

OTHER PUBLICATIONS

2010 Fluorotherm Polymers, Inc. powered by WebiMax.com http://Flurotherm.com/Properties-Physical.asp Comparison of Materials, Typical Properties of Fluoropolymers; 2010.

(56) References Cited

OTHER PUBLICATIONS

Ebnesajjad, S. (2000), Fluoroplastics, vol. 1—Non-Melt Processible Fluoroplastics. William Andrew Publishing/Plastics Design Library. Preface and Chapter 3, pp. 33-38. Online version available at: http://www.knovel.com/we/portal/browse/display?_EXT_KNOVEL_DISPLAY_bookid=64&VerticalID-0.

"olefin (chemical compound)", Encylcopedia Brittanica, Encyclopedia Brittancia Online, Encylcopedia Brittanica Inc., 2013.

* cited by examiner

DENSE ARTICLES FORMED FROM TETRAFLUOROETHYLENE CORE SHELL COPOLYMERS AND METHODS OF MAKING THE SAME

FIELD

The present invention relates generally to tetrafluoroethylene (TFE) core shell copolymers, and more specifically, to dense TFE copolymer films formed from TFE core shell copolymers. Dense articles including the dense TFE copolymer films and a process for making dense articles utilizing TFE core shell copolymers are also provided.

BACKGROUND

Barrier films are used in a wide variety of technologies, including medical and commercial devices. For example, barrier films find use in short and long term implantable medical devices, seals, gaskets, blood contact surfaces, bags, containers, and fabric liners. In addition to good barrier properties, barrier films should have good mechanical properties and be thermally stable. Monolithic, multi-component, and multilayered barrier films have been constructed as barrier materials, but have not provided a combination of thermal stability, strength, and barrier properties.

Polytetrafluoroethylene (PTFE) has been evaluated for use as barrier films. The use of PTFE is advantageous in that it can be used in harsh chemical environments and over a broad range of temperatures. For example, PTFE has exhibited utility as a material for use in harsh chemical environments where other polymers quickly degrade. PTFE also has a useful temperature range from as high as about 260° C. to as low about −273° C. However, PTFE barrier films are characterized by poor mechanical properties such as low tensile strength, poor cold flow resistance or creep resistance, poor cut-through and abrasion resistance, and a general poor mechanical integrity that precludes its consideration in many materials engineering applications.

Low porosity PTFE articles have been made through the use of a skiving process in which solid PTFE films are split or shaved from a thicker preformed article. These PTFE articles are characterized by low strength, poor cold flow resistance, and poor load bearing capabilities in both the length and width directions of the film. Processes such as ram extrusion of PTFE fine powder have also been used to produce low porosity PTFE articles; however, such films also possess relatively poor mechanical characteristics. Attempts have also been made to strengthen the low porosity PTFE films by stretching in the length dimension. However, strength gains are minimal and, by the nature of the process, are achieved in only a single dimension, thus greatly minimizing the utility of the film.

An expanded polytetrafluoroethylene (ePTFE) film may be produced by a process taught in U.S. Pat. No. 3,953,566 to Gore. The porous ePTFE formed by the process has a microstructure of nodes interconnected by fibrils, demonstrates higher strength than unexpanded PTFE, and retains the chemical inertness and wide useful temperature range of unexpanded PTFE. However, such an expanded PTFE film is porous and therefore cannot be used as a barrier layer to low surface tension fluids since such fluids with surface tensions less than 50 dyne-cm pass through the pores of the membrane.

Compressed ePTFE articles in which a platen press was used to densify a thin sheet of ePTFE with and without heat are also taught in U.S. Pat. No. 3,953,566 to Gore. However, cold flow occurred in the press, non-uniform parts resulted, and a density of over 2.1 g/cc was not achieved. Accordingly, the utility of the ePTFE sheet as a barrier film was limited.

Conventional processes for forming TFE-based barrier films involve expansion, compression, and subsequent thermal treatment with or without deformation. Additionally, high strength dense PTFE barrier films may be produced without the use of the expansion and compression processes by the deformation of dried PTFE paste at a temperature above the crystalline melt of PTFE. Although such processes may result in a high strength dense fluoropolymer film, crystallinity is greatly reduced, permeability is not optimized, and the process is limited in scale.

Thus, there exists a need in the art for a TFE-based barrier film that demonstrates improved barrier performance, such as evidenced by a resistance to methane permeation, improved physical and mechanical performance, such as low creep, and high matrix tensile strength, as well as a simplified process for making the TFE-based barrier film.

SUMMARY

One embodiment of the invention relates to a dense article that includes a dense TFE copolymer film that possesses a first endotherm between about 50° C. and about 300° C., a second endotherm between about 320° C. and about 350° C., and a third endotherm between about 350° C. and about 400° C. The TFE copolymer film includes at least 50% TFE monomer and contains at least 3.0% by weight polymerized units of at least one comonomer based on a total weight of the dense TFE copolymer film. The dense TFE copolymer film has a methane permeability less than about 20 µg*micron/cm$^2$/min. The dense articles have a void volume of less than about 20%. The dense articles exhibit improved physical and mechanical properties, including both adhesion and barrier properties. The dense TFE copolymer film may be produced directly from a dried preform without increasing the porosity of the dried preform, as would conventionally be done in expansion processes.

A second embodiment of the invention relates to a process of forming a dense article that includes stretching a dried preform of a TFE copolymer tape at a temperature no greater than about 335° C. to form a dense TFE copolymer film. The dense TFE copolymer film has a first endotherm from about 50° C. to about 300° C., a second endotherm between about 320° C. and about 350° C., and a third endotherm between about 350° C. and about 400° C. Stretching the dried preform may be conducted at a temperature no less than the first endotherm. In another embodiment, stretching the dried preform occurs at a temperature between the first endotherm and the second endotherm. In a further embodiment, the dried preform may be stretched at a temperature within the second endotherm. In a further embodiment, the dried preform may be stretched at a temperature from about 350° C. to about 400° C. The process may further include forming the dried preform, which includes lubricating a TFE core shell copolymer, subjecting the lubricated TFE copolymer to pressure at a temperature below the second endotherm to form a lubricated TFE copolymer tape, and drying the lubricated TFE copolymer tape to substantially remove the lubricant and form the dried preform. The dense TFE copolymer film has a methane permeability less than about 20 µg*micron/cm$^2$/min. The dense article has a void volume of less than about 20%.

BRIEF DESCRIPTION OF THE DRAWINGS

The accompanying drawings are included to provide a further understanding of the disclosure and are incorporated

GLOSSARY

The term "comonomer" as used herein is meant to denote any comonomer present within the core shell tetrafluoroethylene copolymer other than the tetrafluoroethylene monomer.

As used herein, the phrase "substantially only TFE monomer" is meant to denote that the shell portion in the core shell TFE copolymer contains (1) TFE monomer or (2) TFE monomer and an unquantifiable amount (trace amount) of comonomer.

As used herein, the term "copolymer" is meant to describe a reaction product of TFE monomer and at least one comonomer where the comonomer is present in the copolymer in an amount of at least 3.0% by weight polymerized units based on the total weight of the TFE copolymer.

As used herein, the term "dense" is meant to describe an article that has a void volume less than about 20%.

As used herein, the terms "width" and "length" are analogous to the x-direction and y-direction, respectively.

As used herein, the term "lubricant" is meant to describe a processing aid that includes, and in some embodiments, consists of, an incompressible fluid that is not a solvent for the polymer at processing conditions. The fluid-polymer surface interactions are such that it is possible to create an homogenous mixture.

DESCRIPTION OF THE INVENTION

It is to be noted that the terms "TFE copolymer", "TFE core shell copolymer", and "core shell TFE copolymer" may be used interchangeably herein. Additionally, the terms "stretch", "stretched", and "stretching" may be used interchangeably with the terms "deform" "deformed", and "deforming", respectively.

The present invention relates to dense tetrafluoroethylene (TFE) copolymer films and dense articles formed from TFE core shell copolymers. The dense TFE copolymer films may be advantageously produced directly from a dried preform without increasing the porosity of the dried preform, as would conventionally be done in expansion processes. In addition, this disclosure relates to methods for producing dense articles that exhibit improved physical and mechanical properties, including both adhesion and barrier properties. Dense articles including the dense TFE copolymer films have a void volume of less than about 20%. The TFE copolymer film has a methane permeability less than about 20 μg*micron/cm²/min.

A tetrafluoroethylene (TFE) copolymer having a core shell configuration is formed by a process in which tetrafluoroethylene monomers are copolymerized with at least one comonomer other than TFE. As used herein, the term "comonomer" is meant to describe a monomer within the TFE copolymer other than tetrafluoroethylene. The comonomer may be an ethylenically unsaturated monomer having a reactivity with TFE so as to enable polymerization with the TFE monomer. For example the comonomer may be a perfluoroalkyl ethylene monomer, such as perfluorobutylethylene (PFBE), perfluorohexylethylene (PFHE), and perfluoro-octylethylene (PFOE), or it may be a perfluoroalkyl vinyl ether monomer such perfluoro(methyl vinyl ether) (PMVE), perfluoro(ethyl vinyl ether) (PEVE), and perfluoro (propyl vinyl ether) (PPVE).

The comonomer may alternatively, or also, be an olefin such as ethylene, propylene or isobutylene, a fluorinated monomer such as chlorotrifluoroethylene (CTFE), hexafluoropropylene (HFP), vinylidene fluoride (CFH=CH$_2$), vinylidene difluoride (VDF), hexafluoroisobutylene (HFIB) and trifluoro-ethylene (CF$_2$=CFH), or a fluorodioxole of the general formula:

where R$_1$ and R$_2$=F or a 1-3 carbon alkyl group containing at least one fluorine, and X, Y may be F and/or H;
a fluorodioxole of the general formula:

where R$_f$ is a perfluoroalkyl carbon of 1-5 atoms, and R$_1$, R$_2$ may be F and/or CF$_3$; or
a fluorodioxalane of the general formula:

where R$_1$, R$_2$ may be F and/or a perfluoroalkyl carbon of 1-5 atoms.

The core shell TFE copolymer is produced by a polymerization process that includes placing TFE monomer and at least one comonomer in a pressurized reactor, initiating the polymerization reaction with a free radical initiator, feeding TFE monomer and comonomer into the reaction vessel during the polymerization reaction, stopping the addition of comonomer at a point in the polymerization reaction prior to completion of the polymerization reaction, and continuing the polymerization reaction by feeding only TFE monomer into the reaction vessel until the reaction is complete. It is to be appreciated that more than one comonomer may be fed into a pressurized reactor to produce multi-component copolymers, such as, for example, terpolymers.

The initial addition of TFE monomer and comonomer may be introduced into the reactor vessel as a precharge. After the polymerization reaction has started, the comonomer and TFE monomer may be sequentially added, for example, with the comonomer being added prior to the TFE monomer. Alternatively, the TFE monomer and comonomer may be simultaneously added to the reaction vessel. The TFE monomer and comonomer may be introduced incrementally or intermittently to the reaction vessel during the polymerization reaction. Higher concentrations of comonomer in the TFE copolymer produced are achieved by adding the comonomer to the reaction vessel at higher concentration levels. Comonomer may be added to the reaction vessel in an amount of at least about 1.0% by weight, at least about 2.0% by weight, at least about 3.0% by weight, at least about 3.5% by weight, at least about 4.0% by weight, at least about 4.5% by weight, or at least about 5.0% by weight. It is to be noted that the % by weight described herein with reference to the addition of the TFE monomer and/or comonomer to the reaction vessel are based upon total weight of TFE monomer and comonomer fed into the reactor vessel.

At a point between about 15% and about 90%, between about 20% and about 70%, between about 20% and about 60%, or between about 30% and about 60% of the progression of the reaction toward completion, addition of the comonomer to the reaction vessel is stopped. In at least one embodiment, the comonomer addition is stopped at about the mid-point of the polymerization reaction, e.g., at a point from about 30% to about 60% to completion. The polymerization reaction is then permitted to continue by adding only TFE monomer until the reaction is complete. Excess comonomer may be removed (e.g., evacuated) from the reactor, as needed, prior to completion of the reaction.

In the polymerization reaction, substantially non-telogenic dispersing agents may be used. Ammonium perfluoro octanoic acid (APFO or "C-8") is one non-limiting example of a suitable dispersing agent for the polymerization reaction. Programmed addition (precharge and pumping) may be utilized to add the dispersing agent to the reaction vessel. It is to be appreciated that ingredient purity is needed to achieve the desired properties in the dense articles described herein. Ionic impurities, which can increase ionic strength, in addition to soluble organic impurities, which can cause chain transfer or termination, are minimized or even eliminated. In at least one embodiment, ultra-pure water is employed.

The TFE core shell copolymer produced by the process described herein contains a core portion that includes copolymer units and a shell portion that contains substantially only TFE monomer. "Substantially only TFE monomer" as used herein is meant to denote that the shell contains (1) TFE monomer only or (2) TFE monomer and a trace amount (e.g., an unquantifiable amount) of comonomer. The TFE core shell copolymer may contain comonomer in an amount of at least about 1.0% by weight, at least about 2.0% by weight, at least about 3.0% by weight, at least about 3.5% by weight, at least about 4.0% by weight, at least about 4.5% by weight, at least about 5.0% by weight, at least about 5.5% by weight, at least about 6% by weight, at least about 7% by weight, at least about 8% by weight, at least about 9% by weight, or at least about 10% by weight. Accordingly, the amount of tetrafluoroethylene (e.g., TFE monomer) that may be present in the TFE copolymer may be less than about 99% by weight, less than about 98% by weight, less than about 97% by weight, less than about 96.5% by weight, less than about 96% by weight, less than about 95.5% by weight, or less than about 95% by weight. Percent by weight as it pertains to the TFE core shell copolymer is based upon the total weight of the TFE copolymer. In some embodiments, the TFE copolymer includes at least 30% by weight TFE monomer, at least 40% by weight, at least 50% by weight, at least about 60% by weight, at least about 70% by weight, at least about 80% by weight, or at least 90% by weight.

The TFE copolymers are produced in the form of fine particles dispersed within an aqueous medium. In one embodiment, the TFE copolymer may be blended or combined, either by coagulation or by dry blending, with at least 5% by weight, at least about 5.5% by weight, at least about 6% by weight, at least about 6.5% by weight, at least about 7% by weight, at least about 7.5% by weight, at least about 8% by weight, at least about 8.5% by weight, at least about 9% by weight, at least about 9.5% by weight, or at least about 10% by weight of a TFE homopolymer, a thermoplastic polymer, a TFE copolymer, and combinations thereof. It is to be noted that the % by weight as used with respect to blending an additional polymer is based on the total weight of the polymer blend. Non-limiting examples of suitable thermoplastic polymers include, but are not limited to, fluorinated ethylene propylene (FEP), polyvinylidene fluoride (PVDF), perfluoro(alkyl vinyl) ethers (PAVE), perfluoroelastomeric materials (FFKM), a polymer of tetrafluoroethylene, hexafluoropropylene, and vinylidene fluoride (THV), perfluoroalkoxy alkane (PFA), a copolymer of ethylene and tetrafluoroethylene (ETFE), and polychlorotrifluoroethene (PCTFE). The type and/or amount of the polymer(s) to be blended may be selected to provide desirable mechanical or functional end properties.

The TFE core shell copolymers are produced in the form of fine particles dispersed within an aqueous medium and may be processed into a dense TFE copolymer film without any heat treatment above the crystalline melt temperature of polytetrafluoroethylene (PTFE). The dense TFE copolymer film is produced directly from dried extrudate at a deformation temperature less than or equal to about 400° C. and greater than or equal to about 300° C. without increasing the porosity of the dried preform, as would conventionally be done in expansion processes.

To form the dense TFE copolymer film, the TFE copolymer may be subjected to a ram extrusion process where the TFE copolymer is combined with a suitable lubricant (e.g., Isopar® K), blended, compressed into a pellet, and extruded through a die to form a tape. The direction of extrusion is referred to as the y-direction or longitudinal direction. The TFE copolymer tape is then dried to remove or substantially remove the lubricant and form a dried extrudate or dried preform. The term "lubricant", as used herein, is meant to describe a processing aid that includes, and in some embodiments, consists of, an incompressible fluid that is not a solvent for the polymer at processing conditions. Additionally, the fluid-polymer surface interactions are such that it is possible to create an homogenous mixture. The phrase "substantially all the lubricant" is meant to denote that the lubricant is nearly or completely removed from the TFE copolymer tape to form the dried preform.

The dried preform may then be deformed or stretched in at least one direction at a temperature less than or equal to about 400° C. (e.g., from about 300° C. to about 400° C.) to form a dense TFE copolymer film. As used herein, the term "dense" is meant to describe a TFE copolymer film or article that possesses a void volume less than about 20%. The dense TFE copolymer film may possess a void volume less than about 20%, less than about 15%, less than about 10%, less than about 8%, less than about 5%, less than about 3%, or less than about 1%.

In exemplary embodiments, the dried preform is simultaneously deformed in the longitudinal and transverse directions (e.g., both the x- and y-directions) to form a dense TFE copolymer film. The deformation in the longitudinal (y-direction) may occur at a stretch rate of about 10%/sec or lower, about 1,000%/sec or higher, or between about 10%/second and about 1,000%/sec. The deformation in the transverse (x-direction) may occur at a stretch rate of about 10%/sec or lower, about 1,000%/sec or higher, or between about 10%/second to about 1,000%/sec. It is to be appreciated that the deformation of the dried preform may be conducted in either the x- or y-direction or both the x-, y-directions, either sequentially or simultaneously, utilizing a pantograph machine or continuously in a tenter frame or similar machine. Suitable stretch ratios may vary significantly, such as from 1:1 to 1:1,000 or from 1:1 to 1:10,000 or greater and at varying stretch rates.

The dense TFE copolymer films possess at least three separate endotherms. A first endotherm occurs below about 300° C. In at least one embodiment, a first endotherm occurs between about 50° C. and about 300° C. A second endotherm occurs between about 320° C. and about 350° C. A third endotherm occurs at a temperature between about 350° C. to about 400° C. In exemplary embodiments, the third endotherm occurs at about 380° C. It is to be understood that the terms "first", "second", and "third" as used herein are not representative of any kind of order, but are used rather to differentiate the existence of three separate and distinct endotherms in the TFE copolymer film. Also, it is to be noted that blends can be made with the TFE core shell copolymer by blending with another TFE homopolymer, a thermoplastic polymer, and/or another TFE copolymer, such as described herein, which may create an additional endotherm.

Additionally, the dense TFE copolymer films are thin and may have a thickness less than about 250 microns, less than about 150 microns, less than about 100 microns, less than about 50 microns, less than about 30 microns, less than about 10 microns, less than about 5 microns, or less than about 1 micron.

In one exemplary embodiment, the dried preform may be stretched in at least one direction as discussed above at a temperature at or above the first endotherm (i.e., 300° C.) to form a dense TFE copolymer film. In another embodiment, the dried preform may be deformed in at least one direction as discussed above at a temperature between the first endotherm and the second endotherm (i.e., from about 300° C. to about 320° C.). In a further embodiment, the dried preform may be stretched in at least one direction as discussed above at a temperature within the second endotherm (i.e. from about 320° C. to about 350° C.) form a dense TFE copolymer film. In yet another embodiment, the dried preform may be stretched at a temperature from about 350° C. to about 400° C. In at least one other embodiment, the dried preform may be deformed in at least one direction at a temperature from about 300° C. to about 335° C. In another embodiment, the dried preform may be deformed at a temperature less than or equal to about 400° C. to form a dense TFE copolymer film. In further embodiments, the dried preform may be deformed at a temperature less than or equal to about 370° C., less than or equal to about 335° C., or less than or equal to about 320° C. to form a dense TFE copolymer film. In exemplary embodiments, the deformation occurs at a temperature at or above 300° C.

The dried preform may optionally be heated to the deformation temperature (e.g., pre-heated and/or post-heated) prior to and/or after stretching or deforming the dried preform into a dense TFE copolymer film. Thus, in one embodiment, the dried preform is heated to a temperature at or above 300° C. prior to and/or after stretching the dried preform. In another embodiment, the dried preform is heated to a temperature between the first endotherm and the second endotherm (i.e., from about 300° C. to about 320° C.) prior to and/or after stretching. In a further embodiment, the dried preform is heated to a temperature within the second endotherm (i.e. from about 320° C. to about 350° C.) prior to and/or after stretching. Additionally, the dried preform may be heated to a temperature from about 350° C. to about 400° C. prior to and/or after stretching.

The dense TFE copolymer films and dense articles may be utilized as barrier materials. The dense TFE copolymer films exhibit a methane permeability of less than about 20 µg*micron/cm$^2$/min, less than about 15 µg*micron/cm$^2$/min, less than about 10 µg*micron/cm$^2$/min, less than about 5 µg*micron/cm$^2$/min, less than about 1.0 µg*micron/cm$^2$/min, or less than about 0.5 µg*micron/cm$^2$/min. Further, the dense TFE copolymer films have a matrix tensile strength in at least one direction that is greater than or equal to about 5,000 psi, greater than or equal to about 25,000 psi, greater than or equal to about 50,000 psi, greater than or equal to about 75,000 psi or greater than or equal to about 100,000 psi, or higher.

In addition, the dense TFE copolymer films and dense articles that include the dense TFE copolymer films exhibit adhesion characteristics that cannot be achieved in conventional polytetrafluoroethylene (PTFE) homopolymers. That is, the dense TFE copolymer film and dense article can be adhered to itself or to other materials after subjecting it to lower temperature and/or shorter time and/or lower pressure than what is required for adhering a PTFE homopolymer to itself or to other substrates, such as, for example, adhesion promoting substrates, polymeric substrates, or metal substrates. Such adhesion characteristics enable barrier materials to be formed without the need to adhere other substrates, which per unit volume, possess less barrier and mechanical performance. As a result, barrier properties associated with the dense TFE copolymer films and dense articles are maximized.

The dense TFE copolymer films and dense articles including the dense TFE copolymer films may be laminated, adhered, or otherwise bonded (e.g., thermally, mechanically, or chemically) to a substrate. Non-limiting examples of suitable substrates include, but are not limited to, fluorinated ethylene propylene (FEP), perfluoroalkoxy alkane (PFA), polytetrafluoroethylene (PTFE), a polymer of tetrafluoroethylene, hexafluoropropylene, and vinylidene fluoride (THV), polyurethanes, polyamides, ethylene vinyl alcohol (EVOH), and polyvinyl chloride (PVC). The substrate may also be a metallic sheet, an inorganic sheet, or pressure sensitive adhesive. Such laminated structures may facilitate or enhance further bonding to additional layers, such as textiles.

Test Methods

It should be understood that although certain methods and equipment are described below, other methods or equipment determined suitable by one of ordinary skill in the art may be alternatively utilized.

Differential Scanning Calorimetry (DSC)

This test was performed using a TA Instruments Q2000 DSC and TA Instruments standard aluminum pans and lids for Differential Scanning calorimetry (DSC). Weight measurements were performed on a Sartorius MC 210P microbalance. All spectra had endotherms reported in the positive direction on the y-axis.

Calibration of the Q2000 was performed by utilizing the Calibration Wizard available through the Thermal Advantage software supplied with the device. All calibration and resulting scans were performed under a constant nitrogen flow of 50 ml/min.

The sample was loaded into the pan and the weight was recorded to 0.01 mg precision, with samples ranging from 5.00 mg to 10.00 mg. These values were entered into the Thermal Advantage control software for the Q2000. The lid was placed on the pan and crimped using a standard press. A similar pan for reference was prepared, with the exception of the sample article, and its weight was also entered into the software. The pan containing the sample article was loaded onto the sample sensor in the Q2000 and the empty pan was loaded onto the reference sensor. The samples were then equilibrated at −50° C. and ramped at 10° C./min to 410° C. Data were analyzed using Universal Analysis 2000 from TA Instruments.

Methane Permeability

Standard Procedure:

The apparatus used to measure methane permeation comprised of a stainless steel test cell with a top half, a bottom half, an inlet for methane gas, and an inlet for zero air. The term "zero air" refers to compressed air passing through a catalyst bed to remove any hydrocarbons in the air so that the methane is the only hydrocarbon the FID detector measures. The bottom half of the test cell was first purged with zero air. The testing film is sandwiched between the two halves and sealed. A tight seal is formed by two o-rings.

Methane gas and zero air were then introduced into the test sample by way of the inlets. The flow of the methane gas and zero air were controlled using a needle valve and a mass flow controller (Model No. Brooks 5850E), respectively. Methane gas came in from the bottom inlet and came out through the bottom exhaust outlet, which ensured that there is no back pressure on the test sample.

The methane gas which permeated through the test sample was carried in zero air and fed in to the FID detector (Model 8800B, Baseline-Mocon, Inc.). The FID detector continuously measured the concentration of the methane gas, which permeated through the test sample. The detector was connected to a data acquisition system to acquire voltage signals which were then converted to methane concentration ($C_{methane}$) values using a known three point calibration curve.

The test duration lasted at least until the methane concentration reached a steady state. The test duration typically ranged from about 15 minutes to about 40 minutes. The average of the data ($C_{methane}$) collected during the last two minutes of the test duration was reported.

The methane flux (in units of g/cm$^2$/min) was calculated by the following equation:

$$\text{Methane flux} = 0.000654 * C_{methane} * R/A$$

wherein $C_{methane}$ is the average methane concentration in ppm, R is the flow rate of zero air in cm$^3$/min, and A is the area of the test sample in cm$^2$. Methane permeation was measured in duplicate and the average value of methane flux based on two samples was reported.

Accumulation Procedure:

In this procedure, the following variation to the above described standard procedure was used. The zero air inlet and the port were closed while the methane gas was introduced into the test sample. Without zero air flow into the top half of the test cell, the methane gas which permeated through the test sample accumulated inside the top half of the cell. After a fixed duration of methane gas accumulation (typically about 30 minutes to about 60 minutes), the zero air inlet and the port were opened, the methane gas accumulated was then carried in zero air to the FID detector, which measured the concentration of the methane gas ($C_{methane}$) accumulated in the cell during the testing duration. The above equation was used to calculate the methane flux.

Void Percent (%)

Void (%) of the sample was estimated by the difference between bulk density ($\rho_{bulk}$) and skeletal density ($\rho_{skeleton}$) of the sample. The test sample was die-cut into coupons shaped into a circle with a diameter of about 20.3 mm. Four coupons were cut from different locations of the test sample. The thickness was measured at four different locations of each coupon by using the Mitutoyo Litematic VL-50A contact gauge. The average value of thickness was calculated for each coupon. The thickness of the test sample was reported based on the average value for the four coupons. The weight of each coupon was measured using a microbalance (Mettler Toledo Model AT20). The weight of the test sample was reported based on the average value for the four coupons.

The bulk density ($\rho_{bulk}$) was then computed by dividing the weight of the test sample by the product of test sample area and test sample thickness. The coefficient of variance (CV) for the bulk density measurement was typically less than 5% with a mean CV of about 3.6%.

Skeletal density ($\rho_{skeleton}$) or the true density of the test sample was measured using a standard helium pycnometer (Model AccuPyc 1340 with a sample cup of 1 cm$^3$ in volume). The test sample mass was kept above 0.2 g, which was the minimum weight required to get within 99% of the skeletal density value. The instrument was first calibrated using a steel ball with a known volume of 0.05656 cm$^3$. The following test conditions were used; purge cycles=20, purge fill pressure and cycle fill pressure=19.5 psig. An average of 20 measurements of the test same sample were reported. The coefficient of variance (CV) of the 20 replicates was less than 0.2%.

The void percent (%) was then calculated using the following equation:

$$\text{Void \%} = (\rho_{skeleton} - \rho_{bulk})/\rho_{skeleton} * 100$$

Tensile Break Load Measurements & Matrix Tensile Strength (MTS)

Tensile break load was measured using an Instron® 1122 tensile test machine equipped with flat-faced grips and a 0.445 kN load cell. The gauge length was 2.54 cm and the cross-head speed was 2.54 cm/min. The test sample dimensions were 7.6 cm by 0.64 cm. For longitudinal MTS measurements, the larger dimension of the sample was oriented in the machine direction. For the transverse MTS measurements, the larger dimension of the sample was oriented perpendicular to the machine direction. Each sample was weighed using a scale (Mettler Toledo Model AG204). The samples were then tested individually on the tensile tester. Three different samples from each direction were measured. The average of the three maximum load (i.e., the peak force) measurements was used. The longitudinal and transverse MTS were calculated using the following equation:

MTS=(maximum load/cross-section area)*(intrinsic density of PTFE)/intrinsic density of the test sample;

where the bulk density of the inventive copolymer film is taken to be equivalent the intrinsic density of PTFE is taken to be 2.2 g/cc.

EXAMPLES

Example 1

To a 50-liter, horizontal polymerization reactor equipped with a 3-bladed agitator was added 1.5 kg wax, 28 kg of deionized (DI) water, 18 g of ammonium perfluorooctanoic acid (APFO), and 5 g of succinic acid dissolved in about 50 g of DI water. The reactor and contents were heated above the melting point of the wax. The reactor was repeatedly evacuated and pressurized (to about 1 Atm or less) with TFE until the oxygen level was reduced to 20 ppm or less. The contents were briefly agitated at 60 rpm between evacuation and purge cycles to ensure that the water was deoxygenated.

The reactor was heated to 83° C. and agitated at 60 rpm. Subsequently, 2.0 Mpa of VDF was added, followed by addition of TFE until the pressure reached 2.8 Mpa. At this time, $KMnO_4$ in a DI water solution (0.2 g/L) was injected at 80 mL/min until approximately 1 kg of TFE was added. The $KMnO_4$ was added at 60 mL/min for the next 2 Kg of TFE was added. The $KMnO_4$ was then added at 80 mL/min until 4 kg more of TFE was consumed. The total amount of $KMnO_4$ solution added was 4.61 kg.

Approximately 320 g of 20% APFO solution was added in 40 mL increments, the first increment being added after about 1 kg of TFE had been added, followed by increments after each additional 0.5 Kg of TFE for the next 2 kg of TFE and then additions for the next 3 kg of TFE, so that the final increment was added after 8 kg of TFE had been reacted.

VDF and TFE were added after the first added 1 kg of TFE was consumed. VDF and TFE were then added sequentially such that for each 0.5 kg of consumed TFE was followed by 0.5 kg of VDF until 2 kg of TFE and 2 kg of VDF were consumed. The polymerization continued by only feeding TFE until the end of the polymerization.

The polymerization reaction stopped after 14 kg of TFE had been added to the reactor. The weight of the dispersion produced was 48.90 kg containing 33.21% solids. The dispersion was coagulated with nitric acid and dried at 130° C.

The raw dispersion particle size (RDPS) of the polymer particle was 0.321 microns. The VDF concentration in the copolymer was determined to be 27.9 mol % (19.9 wt %), as measured by nuclear magnetic resonance (NMR) spectroscopy.

A dense article using the above described fine powder resin including the core shell copolymer of TFE and VDF was prepared as follows. The resin was mixed with Isopar K® (Exxon Mobil Corp., Fairfax, Va.) at a concentration of 0.201 g/g of resin and formed into a pellet approximately 10.2 cm in diameter at a pressure of about 2758 kPa. The pellet was heated to about 49° C. and ram extruded into a tape having dimensions of about 0.064 cm in thickness and about 20.32 cm in width, through a die which affected a reduction ratio of about 63 to 1, at an average extrusion pressure of about 72678 kPa. The reduction ratio is the ratio of the cross sectional area of the extruder barrel to the cross sectional area of the extruded tape. The tape was dried by heating at 130° C. in order to remove the lubricant. The width of the dried tape was 19.05 cm.

Using a pantograph machine, the tape was heated at 300° C. for 480 seconds then stretched in the longitudinal direction and transverse directions simultaneously at a ratio of about 2.8:1 while maintaining a temperature of about 300° C. The average engineering strain rate was calculated to be about 700%/second.

Figure 1:
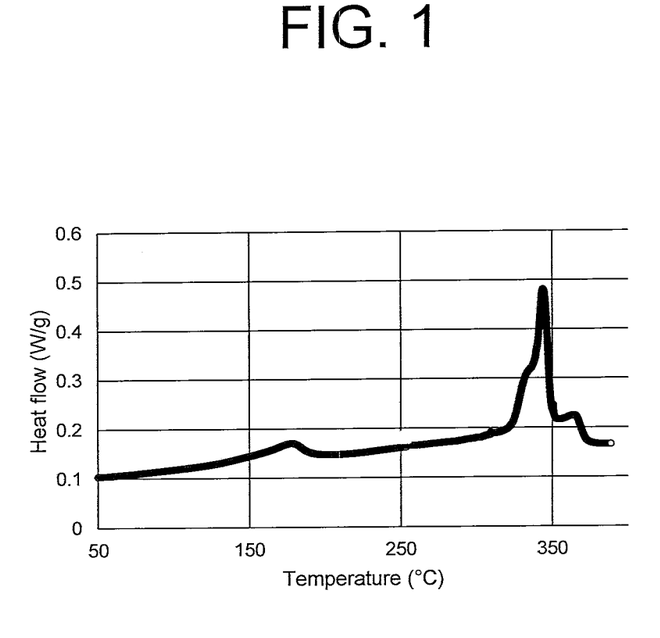
FIG. 1 is a differential scanning calorimetry scan (DSC) depicting three endotherm peaks of a TFE-VDF dense article according to at least one embodiment of the invention.

The resulting dense article was characterized and the results are given in Table I. The standard procedure described above under Methane Permeability was used to measure methane permeation. FIG. 1 depicts a differential scanning calorimetry (DSC) scan showing the melt transition temperature peaks (endotherms) of the dense article, clearly indicating the presence of three peaks, the first peak at 177.32° C., the second peak at 343.83° C., and the third peak at 365.59° C.

Example 2

To a 50-liter, horizontal polymerization reactor equipped with a 3-bladed agitator was added 1.5 kg wax, 28 kg of deionized (DI) water, 18 g of ammonium perfluorooctanoate (APFO), and 5 g of succinic acid dissolved in about 50 g of DI water. The reactor and contents were heated above the melting point of the wax. The reactor was repeatedly evacuated and pressurized (to about 1 Atm or less) with TFE until the oxygen level was reduced to 20 ppm or less. The contents were briefly agitated at 60 rpm between evacuation and purge cycles to ensure that the water was deoxygenated. The reactor was heated to 83° C. and agitated at 60 rpm. Subsequently, 2.8 Mpa of TFE was added, followed by addition of $KMnO_4$ in a DI water solution (0.6 g/L) by injection at 3.75 ml/min until approximately 1 kg of TFE had been added.

The $KMnO_4$ solution was added at 4.6 ml/min for the next 1 Kg of TFE. The $KMnO_4$ solution was then added at 50 ml/min until 1 Kg more of TFE was consumed. The $KMnO_4$ solution was then added at 30 mL/min until 1 kg more of TFE was consumed. The $KMnO_4$ solution was then added at 40 mL/min until 1 kg more of TFE was consumed. The $KMnO_4$ solution was then added at 50 ml/min until 1 kg more of TFE was consumed. The $KMnO_4$ solution was then added at 25 ml/min until 1 kg more of TFE was consumed. The $KMnO_4$ solution was then added at 2 ml/min until 1 kg more of TFE was consumed. The total amount of $KMNO_4$ solution added was 5.725 kg.

Approximately 320 g of 20% APFO solution was added in 40 ml increments, the first increment being added after about 1 kg of TFE was consumed, followed by increments after each additional 1 kg of TFE for the next 6 kg of TFE, so that the final increment was added after 7 kg of TFE had been reacted.

CTFE was pumped into the reactor via liquid feed using a syringe pump. CTFE and TFE were added after the first added 1 kg of TFE was consumed. CTFE and TFE were then added continuously such that for each 1 kg of consumed TFE there was 0.8 L of CTFE consumed. This continued until a total of 3 kg of TFE was consumed and 1.6 L of CTFE was consumed. The polymerization continued by only feeding TFE until the end of the polymerization.

The polymerization reaction stopped after 14.1 kg of TFE had been added to the reactor. The weight of the dispersion produced was 51.78 kg containing 35.61% solids. The dispersion was coagulated with nitric acid and dried at 130° C.

The raw dispersion particle size (RDPS) of the polymer particle was 0.266 microns. The CTFE concentration in the copolymer was determined to be 13 mol % (15 wt %), as measured by nuclear magnetic resonance (NMR) spectroscopy.

A dense article using the above described core shell copolymer of TFE and CTFE was prepared as follows. The resin was mixed with Isopar K® (Exxon Mobil Corp., Fairfax, Va.) at a concentration of 0.252 g/g of resin and formed into a pellet approximately 10.2 cm in diameter at a pressure of about 2758 kPa. The pellet was heated to about 49° C. and ram extruded into a tape having dimensions of about 0.051 cm in thickness and about 20.32 cm in width, through a die which affected a reduction ratio of about 79 to 1, at an average extrusion pressure of about 36804 kPa. The reduction ratio is the ratio of the cross sectional area of the extruder barrel to the cross sectional area of the extruded tape. The tape was dried by heating at 180° C. in order to remove the lubricant. The width of the dried tape was 18.1 cm.

Using a pantograph machine, the tape was heated at 300° C. for 480 seconds and then stretched in the longitudinal direction and transverse directions simultaneously at a ratio of about 4.7:1 while maintaining a temperature of about 300° C. The average engineering strain rate was calculated to be about 700%/second.

The resulting dense article was characterized and the results are given in Table I. The accumulation procedure described above under Methane Permeability was used to measure methane permeation.

Figure 2:
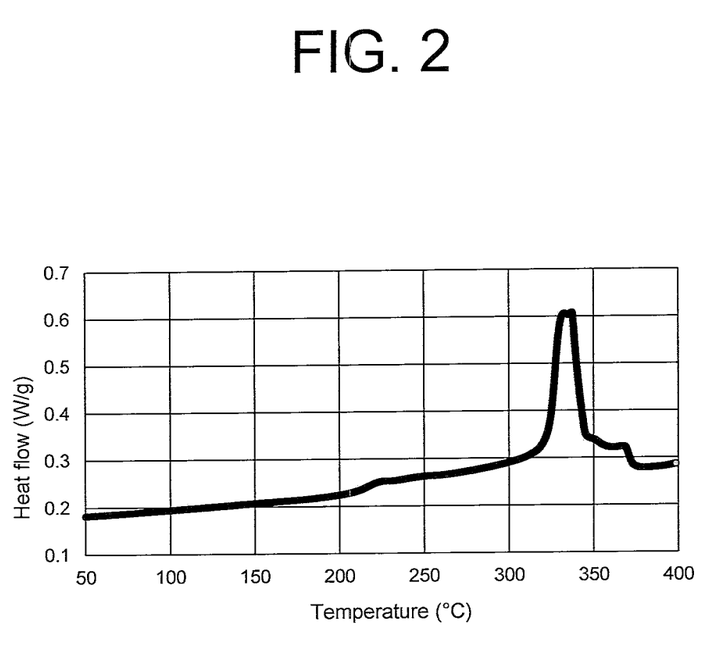
FIG. 2 is a differential scanning calorimetry scan (DSC) depicting three endotherm peaks of a TFE-CTFE dense article in accordance with another embodiment of the invention.

FIG. 2 depicts a differential scanning calorimetry (DSC) scan showing the melt transition temperature peaks (endotherms) of the dense article, clearly indicating the presence of three peaks, the first peak at 223.3° C., the second peak at 332.52° C., and the third peak at 368.57° C.

Example 3

A dense article using the fine powder resin of Example 1 was prepared as follows. The resin was mixed with Isopar K® (Exxon Mobil Corp., Fairfax, Va.) at a concentration of 0.201 g/g of resin and formed into a pellet 10.2 cm in diameter at a pressure of 2758 kPa. The pellet was heated to 49° C. and ram extruded into a tape having dimensions of 0.064 cm in thickness and about 20.32 cm in width, through a die which affected a reduction ratio of about 63 to 1, at an average extrusion pressure of about 72678 kPa. The reduction ratio is the ratio of the cross sectional area of the extruder barrel to the cross sectional area of the extruded tape. The tape was dried by heating at 130° C. in order to remove the lubricant. The width of the dried tape was 19.05 cm.

Using a pantograph machine, the tape was heated at 370° C. for 480 seconds and then stretched in the longitudinal direction and transverse directions simultaneously at a ratio of 3.3:1 while maintaining a temperature of about 370° C. The average engineering strain rate was calculated to be about 700%/second.

The resulting dense article was characterized and the results are given in Table I. The standard procedure described above under Methane Permeability was used to measure methane permeation.

Figure 3:
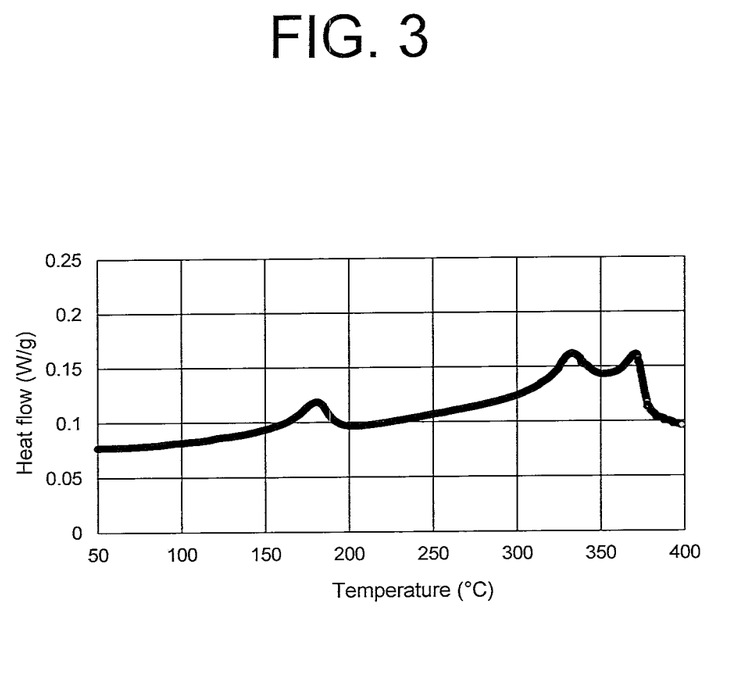
FIG. 3 is a differential scanning calorimetry scan (DSC) depicting three endotherm peaks of a TFE-VDF dense article according to at least one embodiment of the invention.

FIG. 3 depicts a differential scanning calorimetry (DSC) scan showing the melt transition temperature peaks (endotherms) of the dense article, clearly indicating the presence of three peaks, the first peak at 180.77° C., the second peak at 333.09° C., and the third peak at 370.96° C.

Example 4

A dense article using the fine powder resin of Example 2 was prepared as follows. The resin was mixed with Isopar K® (Exxon Mobil Corp., Fairfax, Va.) at a concentration of 0.252 g/g of resin and formed into a pellet 10.2 cm in diameter at a pressure of 2758 kPa. The pellet was heated to 49° C. and ram extruded into a tape having dimensions of 0.051 cm in thickness and about 20.32 cm in width, through a die which affected a reduction ratio of 79 to 1, at an average extrusion pressure of 36804 kPa. The reduction ratio is the ratio of the cross sectional area of the extruder barrel to the cross sectional area of the e. The tape was dried by heating at 180° C. in order to remove the lubricant. The width of the dried tape was 18.1 cm. Using a pantograph machine, the tape was then thermally conditioned at 370° C. for 240 seconds while constrained in the x-y plane.

Using a pantograph machine, the tape was heated at 370° C. for 10 seconds and then stretched in the longitudinal direction and transverse directions simultaneously at a ratio of 4.6:1 while maintaining a temperature of about 370° C. The average engineering strain rate was calculated to be about 700%/second.

The resulting dense article was characterized and the results are given in Table I. The standard procedure described above under Methane Permeability was used to measure methane permeation.

Figure 4:
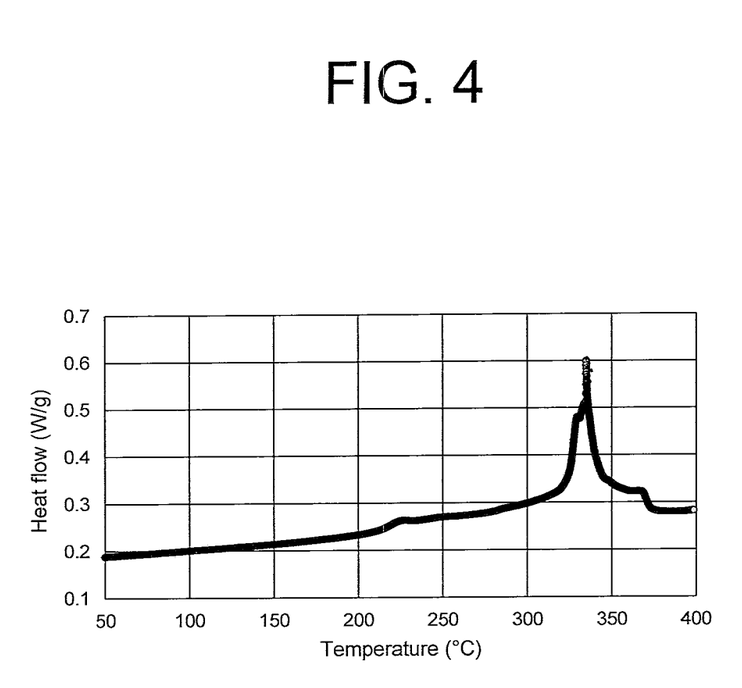
FIG. 4 is a differential scanning calorimetry scan (DSC) depicting three endotherm peaks of a TFE-CTFE dense article in accordance with at least one embodiment of the invention.

FIG. 4 depicts a differential scanning calorimetry (DSC) scan showing the melt transition temperature peaks (endotherms) of the dense article, clearly indicating the presence of three peaks, the first peak at 224.81° C., and the second peak at 334.83° C., and the third peak at 368.2° C.

TABLE 1

|  | Thickness (micron) | Methane Permeability normalized to thickness (µg*micron/cm$^2$/min) | Void Volume (%) | Matrix Tensile Strength (psi)] MD | Matrix Tensile Strength (psi) TD |
| --- | --- | --- | --- | --- | --- |
| Example 1 | 52.51 | 0.152 | 3.21 | 17491 | 16575 |
| Example 2 | 16.94 | 0.019 | 7.77 | 10781 | 11995 |
| Example 3 | 45.13 | 0.309 | 2.79 | 23588 | 20300 |
| Example 4 | 18.36 | 0.18 | 9.88 | 19170 | 15955 |

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:
1. A process of forming a dense article comprising:
   stretching a dried preform of a TFE copolymer tape at a temperature no greater than about 335° C. to form a dense TFE copolymer film, said dense TFE copolymer film having a first endotherm peak between about 50° C. and about 300° C., a second endotherm peak between about 320° C. and about 330° C., and a third endotherm peak between about 350° C. and about 400° C.

2. The process of claim 1, wherein said stretching occurs at a temperature at or above 300° C.

3. The process of claim 1, wherein said stretching occurs at a temperature between about 300° C.

4. The process of claim 1, wherein said stretching occurs at a temperature from about 320° C. and about 330° C.

5. The process of claim 1, further comprising heat treating said dried preform of a TFE copolymer tape to a temperature selected from (1) a temperature at or above 300° C., (2) a temperature between about 300° C. and about 320° C., and (3) a temperature from about 320° C. to about 330° C. prior to said stretching of said dried preform.

6. The process of claim 1, further comprising heat treating said dense TFE copolymer film to a temperature selected from (1) a temperature at or above 300° C., (2) a temperature between about 300° C. and about 320° C., and (3) a temperature from about 320° C. to about 330° C. after said stretching of said dried preform.

7. The process of claim 1, wherein said dense TFE copolymer film has a methane permeability less than about 20 μg*micron/cm²/min.

8. The process of claim 1, wherein said dense article has a void volume of less than about 20%.

9. The process of claim 1, further comprising forming said dried preform, said forming comprising:
lubricating a TFE copolymer;
subjecting said lubricated TFE copolymer to pressure at a temperature below about 330° C. to form a lubricated TFE copolymer tape; and
drying said lubricated TFE copolymer tape to substantially remove said lubricant from said lubricated TFE copolymer tape and form said dried preform.

10. The process of claim 9, wherein said TFE copolymer comprises a core shell TFE copolymer and said core shell TFE copolymer, and
wherein said TFE copolymer comprises:
(a) a first, core portion comprising a polymer chain of TFE monomer and at least one comonomer; and
(b) a second, shell portion comprising a polymer chain of substantially only TFE monomer,
wherein said core-shell TFE copolymer comprises at least 3.0% by weight polymerized units of said at least one comonomer based on the total weight of said TFE copolymer.

11. The process of claim 1, further comprising heat treating said dense TFE copolymer film to a temperature at or below 300° C. prior to said stretching of said dried preform.

12. The process of claim 1, further comprising heat treating said dense TFE copolymer film to a temperature at or below 300° C. after said stretching of said dried preform.

13. A process of forming a dense article comprising:
stretching a dried preform of a TFE copolymer tape at a temperature no greater than about 400° C. to form a dense TFE copolymer film, said dense TFE copolymer film having a first endotherm peak between about 50° C. and about 303° C., a second endotherm peak between about 320° C. and about 330° C., and a third endotherm peak between about 350° C. and about 400° C.

14. The process of claim 13, wherein said stretching occurs at a temperature from about 300° C. to about 335° C.

15. The process of claim 13, wherein said stretching occurs at a temperature between about 300° C. and about 370° C.

16. The process of claim 13, wherein said stretching occurs at a temperature between about 300° C. and about 320° C.

17. The process of claim 13, wherein said stretching occurs at a temperature between about 300° C. and about 400° C.

18. The process of claim 13, further comprising heat treating said dried preform of a TFE copolymer tape to a temperature selected from (1) a temperature at or above 300° C., (2) a temperature between about 300° C. and about 320° C., and (3) a temperature between about 320° C. to about 330° C. prior to said stretching of said dried preform.

19. The process of claim 13, further comprising heat treating said dense TFE copolymer film to a temperature selected from (1) a temperature at or above 300° C., (2) a temperature between about 300° C. to about 320° C., and (3) a temperature between about 320° C. to about 330° C. after said stretching of said dried preform.

20. The process of claim 13, wherein said dense TFE copolymer film has a methane permeability less than about 20 μg*micron/cm²/min.

21. The process of claim 13, wherein said dense article has a void volume of less than about 20%.

22. The process of claim 13, further comprising heat treating said dense TFE copolymer film to a temperature at or below 300° C. prior to said stretching of said dried preform.

23. The process of claim 13, further comprising heat treating said dense TFE copolymer film to a temperature at or below 300° C. after said stretching of said dried preform.

24. A process of forming a dense article comprising:
stretching a dried preform of a TFE copolymer tape at a temperature no greater than about 335° C. to form a dense TFE copolymer film, said dense TFE copolymer film having a first endotherm peak between about 50° C. and about 300° C., a second endotherm peak between about 320° C. and about 350° C., and a third endotherm peak at approximately 380° C.

25. The process of claim 24, wherein said second endotherm peak is between about 320° C. and about 330° C.

26. The process of claim 24, wherein said second endotherm peak is between about 330° C. and about 350° C.

27. The process of claim 24, wherein said stretching occurs at a temperature at or above 300° C.

28. The process of claim 24, wherein said stretching occurs at a temperature between about 300° C. to about 320° C.

29. The process of claim 24, wherein said stretching occurs between about 320° C.

30. The process of claim 24, further comprising heat treating said dried preform of a TFE copolymer tape to a temperature selected from (1) a temperature at or above 300° C., (2) a temperature between about 300° C. and about 320° C., and (3) a temperature between about 320° C. to about 350° C. prior to said stretching of said dried preform.

31. The process of claim 24, further comprising heat treating said dense TFE copolymer film to a temperature selected from (1) a temperature at or above 300° C., (2) a temperature between about 300° C. to about 320° C., and (3) a temperature between about 320° C. to about 350° C. after said stretching of said dried preform.

32. The process of claim 24, wherein said dense TFE copolymer film has a methane permeability less than about 20 μg*micron/cm²/min.

33. The process of claim 24, wherein said dense article has a void volume of less than about 20%.

34. The process of claim 24, further comprising forming said dried preform, said forming comprising:
lubricating a TFE copolymer;
subjecting said lubricated TFE copolymer to pressure at a temperature below about 350° C. to form a lubricated TFE copolymer tape; and
drying said lubricated TFE copolymer tape to substantially remove said lubricant from said lubricated TFE copolymer tape and form said dried preform.

35. The process of claim 34, wherein said TFE copolymer comprises a core shell TFE copolymer and said core shell TFE copolymer, and
wherein said TFE copolymer comprises:
(a) a first, core portion comprising a polymer chain of TFE monomer and at least one comonomer; and
(b) a second, shell portion comprising a polymer chain of substantially only TFE monomer,
wherein said core-shell TFE copolymer comprises at least 3.0% by weight polymerized units of said at least one comonomer based on the total weight of said TFE copolymer.

36. The process of claim 24, further comprising heat treating said dense TFE copolymer film to a temperature at or below 300° C. prior to said stretching of said dried preform.

37. The process of claim 24, further comprising heat treating said dense TFE copolymer film to a temperature at or below 300° C. after said stretching of said dried preform.

38. A process of forming a dense article comprising:
stretching a dried preform of a TFE copolymer tape at a temperature no greater than about 400° C. to form a dense TFE copolymer film, said dense TFE copolymer film having a first endotherm peak between about 50° C. and about 300° C., a second endotherm peak between about 320° C. and about 350° C. and a third endotherm peak at approximately 380° C.

39. The process of claim 38, wherein said second endotherm peak is between about 320° C. and about 330° C.

40. The process of claim 27, wherein said second endotherm peak is between about 330° C. and about 350° C.

41. The process of claim 38, wherein said stretching occurs at a temperature from about 300° C. to about 335° C.

42. The process of claim 38, wherein said stretching occurs at a temperature between about 300° C. and about 370° C.

43. The process of claim 38, wherein said stretching occurs at a temperature between about 300° C. and about 320° C.

44. The process of claim 38, wherein said stretching occurs at a temperature between about 300° C. and about 400° C.

45. The process of claim 38, further comprising heat treating said dried preform of a TFE copolymer tape to a temperature selected from (1) a temperature at or above 300° C., (2) a temperature between about 300° C. to about 320° C., and (3) a temperature between about 320° C. to about 350° C. prior to said stretching of said dried preform.

46. The process of claim 38, further comprising heat treating said dense TFE copolymer film to a temperature selected from (1) a temperature at or above 300° C., (2) a temperature between about 300° C. to about 320° C., and (3) a temperature between about 320° C. to about 350° C. after said stretching of said dried preform.

47. The process of claim 38, wherein said dense TFE copolymer film has a methane permeability less than about 20 µg*micron/cm²/min.

48. The process of claim 38, wherein said dense article has a void volume of less than about 20%.

49. The process of claim 38, further comprising heat treating said dense TFE copolymer film to a temperature at or below 300° C. prior to said stretching of said dried preform.

50. The process of claim 38, further comprising heat treating said dense TFE copolymer film to a temperature at or below 300° C. after said stretching of said dried preform.

51. A process of forming a dense article comprising:
stretching a dried preform of a TFE copolymer tape at a temperature no greater than about 335° C. to form a dense TFE copolymer film, said dense TFE copolymer film having a first endotherm peak between about 50° C. and about 300° C., a second endotherm peak between about 320° C. and about 350° C., and a third endotherm peak between about 350° C. and about 400° C.

52. The process of claim 51, wherein said second endotherm peak is between about 320° C. and about 330° C.

53. The process of claim 51, wherein said second endotherm peak is between about 330° C. and about 350° C.

54. The dense article of claim 51, wherein said third endotherm is about 380° C.

55. The process of claim 51, wherein said stretching occurs at a temperature no less than about 50° C.

56. The process of claim 51, wherein said stretching occurs at a temperature between about 300° C. and about 320° C.

57. The process of claim 51, wherein said stretching occurs between about 320° C. and about 350° C.

58. The process of claim 51, further comprising heat treating said dried preform of a TFE copolymer tape to a temperature selected from (1) a temperature at or above 300° C., (2) a temperature between about 300° C. and about 320° C., and (3) a temperature between about 320° C. and about 350° C. prior to said stretching of said dried preform.

59. The process of claim 51, further comprising heat treating said dense TFE copolymer film to a temperature selected from (1) a temperature at or above 300° C. below said first endotherm, (2) a temperature between about 300° C. and about 320° C., and (3) a temperature between about 320° C. to about 350° C. after said stretching of said dried preform.

60. The process of claim 51, wherein said dense TFE copolymer film has a methane permeability less than about 20 µg*micron/cm²/min.

61. The process of claim 51, wherein said dense article has a void volume of less than about 20%.

62. The process of claim 51, further comprising heat treating said dense TFE copolymer film to a temperature at or below 300° C. prior to said stretching of said dried preform.

63. The process of claim 51, further comprising heat treating said dense TFE copolymer film to a temperature at or below 300° C. after said stretching of said dried preform.

64. A process of forming a dense article comprising:
stretching a dried preform of a TFE copolymer tape at a temperature no greater than about 400° C. to form a dense TFE copolymer film, said dense TFE copolymer film having a first endotherm peak between about 50° C. and about 300° C., a second endotherm peak between about 320° C. and about 350° C., and a third endotherm peak between about 350° C. and about 400° C.

65. The process of claim 64, wherein said second endotherm peak is between about 320° C. and about 330° C.

66. The process of claim 64, wherein said second endotherm peak is between about 330° C. and about 350° C.

67. The process of claim 64, wherein said second endotherm peak is between about 320° C. and about 330° C.

68. The process of claim 64, wherein said second endotherm peak is between about 330° C. and about 350° C.

69. The process of claim 64, wherein said stretching occurs at a temperature from about 300° C. to about 335° C.

70. The process of claim 64, wherein said stretching occurs at a temperature between about 300° C. and about 370° C.

71. The process of claim 64, wherein said stretching occurs at a temperature between about 300° C. and about 320° C.

72. The process of claim 64, wherein said stretching occurs at a temperature between about 300° C. and about 400° C.

73. The process of claim 64, further comprising heat treating said dried preform of a TFE copolymer tape to a temperature selected from (1) a temperature at or above 300° C., (2) a temperature between about 300° C. and about 320° C., and (3) a temperature between about 320° C. to about 350° C. prior to said stretching of said dried preform.

74. The process of claim 64, further comprising heat treating said dense TFE copolymer film to a temperature selected from (1) a temperature at or above 300° C., (2) a temperature between about 300° C. and about 320° C., and (3) a temperature between about 320° C. to about 350° C. after said stretching of said dried preform.

75. The process of claim 64, wherein said dense TFE copolymer film has a methane permeability less than about 20 µg*/micron/cm²/min.

76. The process of claim 64, wherein said dense article has a void volume of less than about 20%.

77. The process of claim 64, further comprising heat treating said dense TFE copolymer film to a temperature at or below 300° C. prior to said stretching of said dried preform.

78. The process of claim 64, further comprising heat treating said dense TFE copolymer film to a temperature at or below 300° C. after said stretching of said dried preform.

* * * * *

UNITED STATES PATENT AND TRADEMARK OFFICE
CERTIFICATE OF CORRECTION

PATENT NO. : 9,644,054 B2
APPLICATION NO. : 14/577597
DATED : May 9, 2017
INVENTOR(S) : Lawrence A. Ford et al.

It is certified that error appears in the above-identified patent and that said Letters Patent is hereby corrected as shown below:

At Column 15, Claim 12, Line 62, change "and about 303°C, a second endotherm peak" to "and about 300°C, a second endotherm peak".

Signed and Sealed this
Fourteenth Day of August, 2018

Andrei Iancu
*Director of the United States Patent and Trademark Office*